United States Patent
Levitan et al.

(10) Patent No.: US 6,484,256 B1
(45) Date of Patent: Nov. 19, 2002

(54) APPARATUS AND METHOD OF BRANCH PREDICTION UTILIZING A COMPARISON OF A BRANCH HISTORY TABLE TO AN ALIASING TABLE

(75) Inventors: David Stephen Levitan, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/370,680

(22) Filed: Aug. 9, 1999

(51) Int. Cl.[7] ............................ G06F 9/00; G06F 9/44
(52) U.S. Cl. ...................... 712/240; 712/239
(58) Field of Search .................. 712/240, 239, 712/238

(56) References Cited

U.S. PATENT DOCUMENTS

| | | | | |
|---|---|---|---|---|
| 4,477,872 A | * | 10/1984 | Losq et al. ............. | 712/240 |
| 4,763,245 A | * | 8/1988 | Emma et al. ........... | 712/240 |
| 5,142,634 A | * | 8/1992 | Fite et al. .............. | 712/240 |
| 5,163,140 A | * | 11/1992 | Stiles et al. ............ | 712/240 |
| 5,367,703 A | * | 11/1994 | Levitan .................. | 712/240 |
| 5,577,217 A | * | 11/1996 | Hoyt et al. ............. | 712/200 |
| 5,584,001 A | * | 12/1996 | Hoyt et al. ............. | 712/240 |
| 5,644,759 A | * | 7/1997 | Lucas et al. ............ | 712/240 |
| 5,687,360 A | * | 11/1997 | Chang .................... | 712/240 |
| 5,758,143 A | * | 5/1998 | Levitan .................. | 712/240 |
| 6,247,122 B1 | * | 6/2001 | Henry et al. ............ | 712/239 |
| 6,374,349 B1 | * | 4/2002 | McFarling ............... | 712/239 |
| 2001/0032309 A1 | * | 10/2001 | Henry et al. ............ | 712/239 |

OTHER PUBLICATIONS

"Branch History Table Indexing to Prevent Pipeline Bubbles in Wide–Issue Superscalar Processors", by Tse–Yu and Yale N. Patt, pp. 164–175, published 1993 by IEEE.*

"Alternative Implementations of Two–Level Adaptive Branch Prediction", by Tse–Yu and Yale N. Patt (pp. 124–134) published 1992 by ACM.*

"Computer Architecture A Quantitative Approach", Second Edition, Hennessy and Patterson, 1996 Morgan and Kaufmann Publishers, Inc., pp. 263–264.*

"The Agree Predictor: A Mechanism for reducing Negative Branch History Interference", by Eric Sprangle, Robert S. Chappell, Mitch alsup and Yale Patt, pp. 284–291, 1997 ACM Press.*

* cited by examiner

*Primary Examiner*—Thomas Lee
*Assistant Examiner*—James K. Trujillo
(74) *Attorney, Agent, or Firm*—Anthony V. S. England; Bracewell & Patterson, L.L.P.

(57) ABSTRACT

Improved conditional branch instruction prediction by detecting branch aliasing in a branch history table. Each entry in an aliasing table is associated with only one of a plurality of conditional branch instructions tracked by the branch history table. Prior to executing a conditional branch instruction, outcome of the execution of the conditional branch instruction is predicted utilizing the branch history table entry associated with the conditional branch instruction. Outcome of the execution of the conditional branch instruction is also predicted utilizing the aliasing table entry associated with the conditional branch instruction. Branch aliasing is detected by comparing the prediction made utilizing the branch history table with the prediction made utilizing the aliasing table. In response to the predictions being different, a determination is made that branch aliasing occurred, and the prediction made utilizing the aliasing table is utilized for predicting the outcome of the execution of the conditional branch instruction.

14 Claims, 4 Drawing Sheets

APPARATUS AND METHOD OF BRANCH PREDICTION UTILIZING A COMPARISON OF A BRANCH HISTORY TABLE TO AN ALIASING TABLE

BACKGROUND OF THE INVENTION

1. Field of the Invention

The present invention relates in general to data processing systems and, in particular, to a superscalar processor for improving the accuracy of predictions of execution of a plurality of conditional branch instructions. Still more particularly, the present invention relates to a superscalar processor for improving the accuracy of predictions of execution of a plurality of conditional branch instructions by detecting aliasing in a branch history table.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required. These multiple instructions may be executed in their original sequence, or out of order in a sequence which is different in some way from the original sequence.

A programmer writes code in a particular sequence. The code may include various branch, or jump, instructions. Branch instructions cause a departure during the execution of instructions from the original sequential order of the instructions. One method for increasing the speed of of instructions is to predict the likely outcome of the execution of a conditional branch instruction. A prediction is made as to whether or not a branch will be taken the next time this conditional branch instruction is executed.

A branch history table, also called a branch prediction buffer, may be maintained within a processor which is a small amount of memory which tracks whether or not a branch was taken the last time it was executed. Therefore, for a particular conditional branch instruction, if the last time this conditional branch instruction was taken, a prediction will be made that the next time the conditional branch instruction is executed it will again be taken.

A conditional branch instruction is associated with one entry of the branch history table. Typically, programs will have a large number of conditional branch instructions. Because the branch history table is a small block of memory, there are not enough entries in the table to map to only one conditional branch instruction for each entry. Therefore, some entries in the branch history table may have two or more associated conditional branch instructions. This can result in mispredictions because it is not known for which conditional branch instruction the current prediction is made.

Therefore a need exists for a data processing system and method for improving the accuracy of predictions of conditional branch instructions where the system includes a branch history table having a plurality of entries, some of which are associated with at least two of the conditional branch instructions.

SUMMARY OF THE INVENTION

A data processing system and method are disclosed for improving the accuracy of predictions of a plurality of conditional branch instructions by detecting branch aliasing. A branch history table is established within the processor which includes a plurality of entries. Some of the plurality of entries are associated with at least two of the conditional branch instructions. An aliasing table is established within the processor which includes a plurality of entries. Each of the plurality of aliasing table entries is associated with only one of the plurality of conditional branch instructions. Prior to executing one of the plurality of conditional branch instructions, an outcome of the execution of the one of the plurality of conditional branch instructions is predicted utilizing one of the plurality of branch history table entries associated with the one of the plurality of conditional branch instructions. An outcome of the execution of the one of the plurality of conditional branch instructions is also predicted utilizing one of the plurality of aliasing table entries which is associated with the one of the plurality of conditional branch instructions. Branch aliasing is detected by comparing the prediction made utilizing the branch history table with the prediction made utilizing the aliasing table. In response to the predictions being different, a determination is made that branch aliasing occurred. The prediction made utilizing the aliasing table is then utilized for predicting the outcome of the execution of the one of the plurality of conditional branch instructions.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
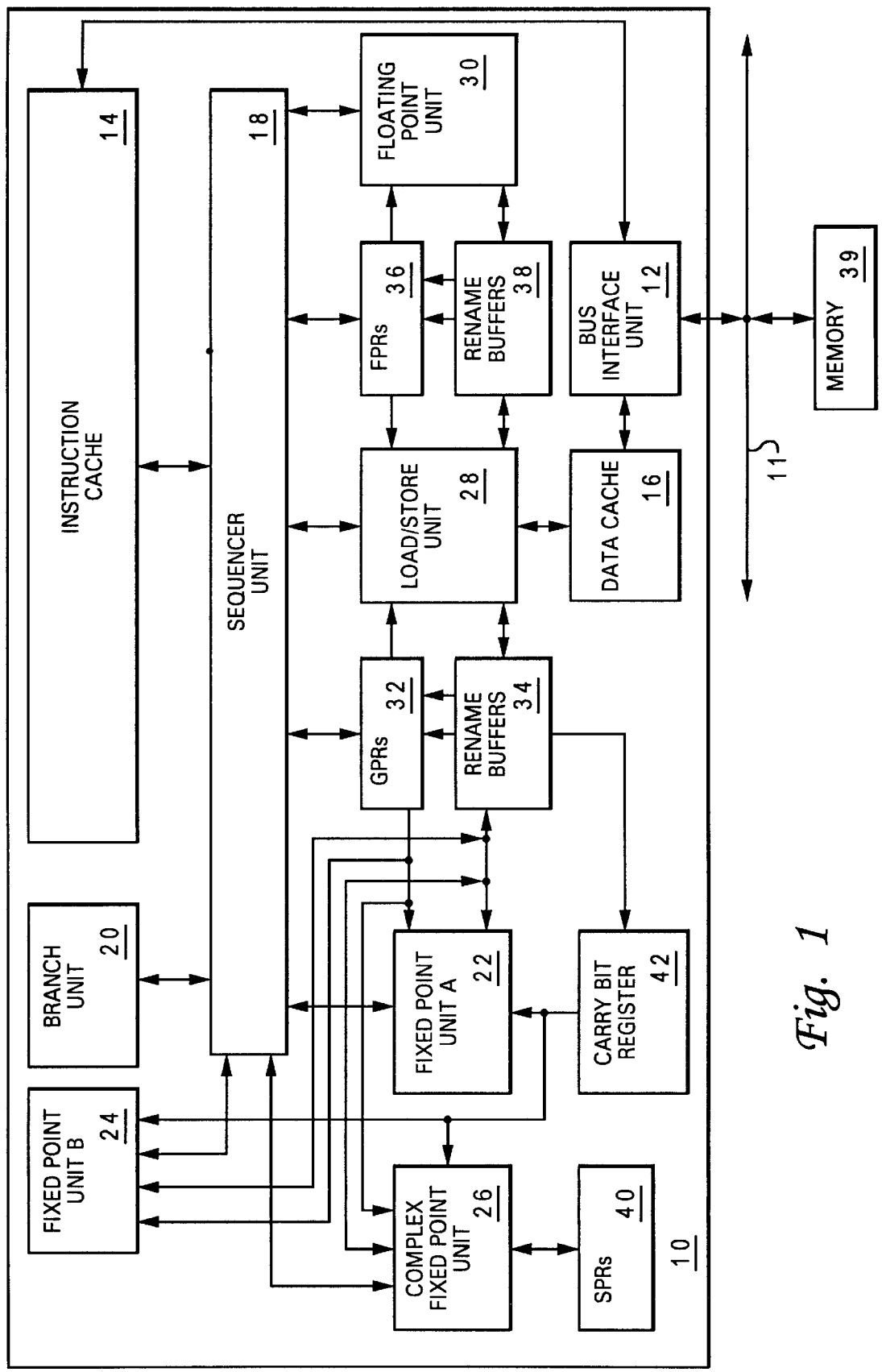
FIG. 1 illustrates a block diagram of a superscalar processor for processing information in accordance with the method and system of the present invention.

A preferred embodiment of the present invention and its advantages are better understood by referring to FIGS. 1–5 of the drawings, like numerals being used for like and corresponding parts of the accompanying drawings.

The present invention is a method and system in a superscalar processor for improving the accuracy of predictions of the execution of a plurality of conditional branch instructions by detecting branch aliasing in a branch history table. The processor includes a branch history table which includes a plurality of entries. Some of the entries of the branch history table are associated with at least two of the conditional branch instructions. An aliasing table is also provided to permit the detection of branch aliasing in the branch history table.

In the preferred embodiment, the aliasing table will include a sufficient number of entries such that each conditional branch instruction will be associated with only one of the entries of the aliasing table. However, those skilled in the art will recognize that the invention described herein may be implemented using an aliasing table where some of the entries are associated with more than one conditional branch instruction. For the purposes of the following description, an aliasing table having one entry for each conditional branch instruction is described.

Multiple conditional branch instructions may be associated with the same entry of the branch history table. Therefore, it is not known for which of the associated instructions a prediction is made when using the entry to predict the outcome of execution of one of these instructions. The prediction could be accurate for only one of the instructions associated with the entry.

The branch history table includes a plurality of entries. A plurality of counters are also provided. Each counter is associated with a different one of the branch history table entries. Each entry has a field of at least two-bits which represents the current value of one of the counters associated with the entry. The aliasing table includes a larger quantity of entries than the branch history table. However, in the aliasing table each entry field is smaller, preferably only one bit. In the aliasing table, each entry is preferably associated with only one conditional branch instruction. In this manner, the branch history table will provide more information in each entry, but it may be unclear with which instruction the information is associated. Although the aliasing table provides accurate information for each instruction, the information is less precise.

When instructions are processed, if the instruction is a conditional branch instruction, a determination is made regarding which branch history table entry is associated with this instruction. A determination is also made regarding which aliasing table entry is associated with this instruction. A prediction is made using the branch history table entry regarding whether this conditional branch will be taken. A prediction is also made using the aliasing table entry regarding whether this conditional branch will be taken.

A conditional branch will be predicted to be taken using the associated entry in the branch history table if the value of the entry is equal to or greater than half the maximum possible value. If a two-bit counter is utilized, the values "00" and "01" will predict the conditional branch to not be taken, and the values "10" and "11" will predict the conditional branch to be taken.

A branch will be predicted to be taken using the associated entry in the aliasing table if the value of the entry is a one. A branch will be predicted to be not taken using the associated entry in the aliasing table if the value of the entry is a zero.

If the prediction using the aliasing table entry and the prediction using the branch history table entry disagree, branch aliasing has occurred, i.e. the entry in the branch history table is correct for a different conditional branch instruction but not for this conditional branch instruction. When the predictions disagree, the aliasing table prediction is utilized, and the branch history table entry is corrected to agree with the prediction of the aliasing table entry for this instruction.

The branch history table, however, is only minimally corrected. For example, if the aliasing table entry predicts its associated conditional branch instruction to be taken, the branch history table must be corrected to a value which indicates a prediction that the branch will be taken. The value chosen for the entry of the branch history table is the minimum value which indicates a prediction that the branch will be taken. Therefore, for a two-bit entry field, the chosen value will be "10". Similarly, if the aliasing table entry predicts its associated conditional branch instruction to not be taken, the branch history table must be corrected to a value which indicates a prediction that the branch will not be taken. The value chosen for the entry of the branch history table is the minimum correction. Therefore, for a two-bit entry field, the chosen value will be "01".

FIG. 1 is a block diagram of a processor 10 for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28, and a floating point unit ("FPU") 30. FXUA 22, FXUB 24, CFXU 26, and LSU 28 input their source operand information from general purpose architectural registers ("GPRs") 32 and fixed point rename buffers 34. FXUA 22 and FXUB 24 input a "carry bit" from a carry bit ("CA") register 42. FXUA 22, FXUB 24, CFXU 26, and LSU 28 output results (destination operand information) of their operations for storage at selected entries in fixed point rename buffers 34. Also, CFXU 26 inputs and outputs source operand information and destination operand information to and from special purpose register processing unit ("SPR unit") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". An instruction is normally processed as six stages, namely fetch, decode, dispatch, execute, completion, and writeback.

In the fetch stage, sequencer unit 18 selectively inputs (from instruction cache 14) one or more instructions from one or more memory addresses storing the sequence of instructions discussed further hereinabove in connection with branch unit 20, and sequencer unit 18.

In the decode stage, sequencer unit 18 decodes a plurality of fetched instructions.

In the dispatch stage, sequencer unit 18 selectively dispatches decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

A completion buffer 48 is provided within sequencer 18 to track the completion of the multiple instructions which are being executed within the execution units. Upon an indication that an instruction or a group of instructions have been completed successfully, in an application specified sequential order, completion buffer 48 may be utilized to initiate the transfer of the results of those completed instructions to the associated general purpose registers.

Figure 2:
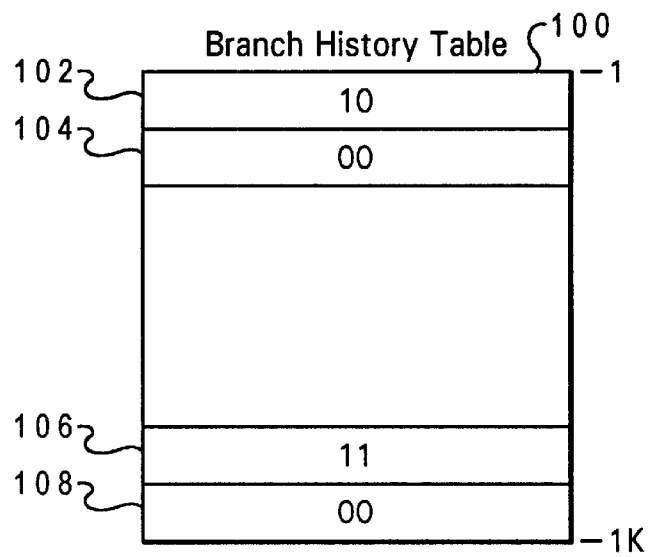
FIG. 2 depicts a branch history table including a plurality of entries, wherein some of the entries are associated with two or more conditional branch instructions in accordance with the method and system of the present invention.

FIG. 2 depicts a branch history table including a plurality of entries, wherein some of the entries are associated with two or more conditional branch instructions in accordance with the method and system of the present invention. The branch history table 100 includes a plurality of entries, such as entry 102, 104, 106, and 108. Each of the entries is utilized to predict whether a conditional branch instruction associated with the entry will be taken. Each entry field is preferably a two-bit field. For the example depicted, branch history table 100 is a 1 Kbyte sized table. However, those skilled in the art will recognize that any size entry field or size of table may be utilized. Each entry field contains the current value of a counter (not shown) associated with the field.

In the preferred embodiment, a hashing scheme is utilized to associate a conditional branch instruction with a particular entry. A conditional branch instruction is associated with an entry of the branch history table 100 utilizing the address of the conditional branch instruction. A portion of the address of the conditional branch instruction is used to determine which entry of branch history table 100 to utilize for the instruction.

For example, for a 64-bit RISC architecture, bits 52–61 may be utilized to select an entry in the branch history table 100, while bits 48–61 may be utilized to select an entry in the aliasing table 200. Those skilled in the art will recognize that other association schemes may be utilized.

Some of the entries are associated with at least two conditional branch instructions. Therefore, for these entries it cannot be known for which instruction the current value is accurate. The current value of an entry may not be accurate for any of the conditional branch instructions associated with the entry.

Figure 3:
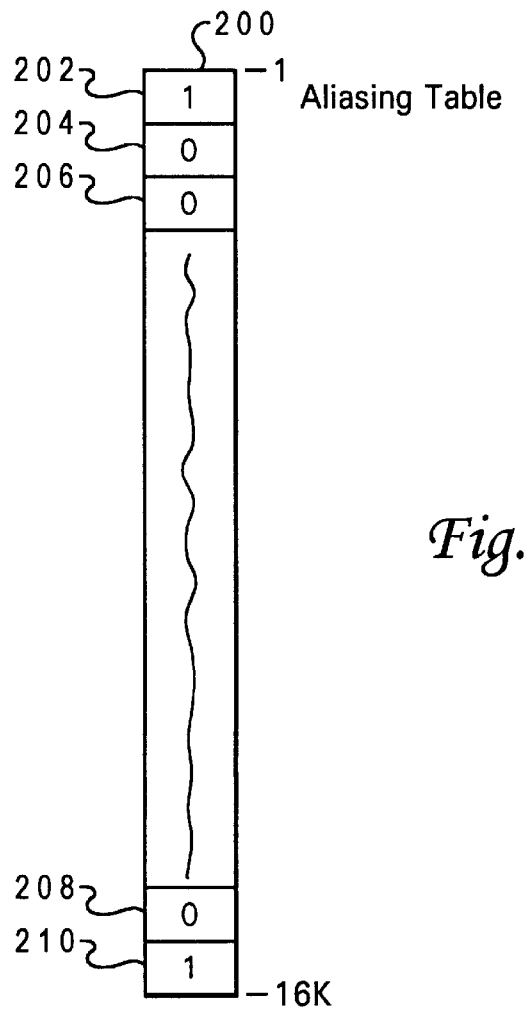
FIG. 3 illustrates an aliasing table including a plurality of entries, wherein each of the entries is associated with only one conditional branch instruction in accordance with the method and system of the present invention.

FIG. 3 illustrates an aliasing table including a plurality of entries, wherein each of the entries is associated with only one conditional branch instruction in accordance with the method and system of the present invention. The branch history table 200 includes a plurality of entries, such as entry 202, 204, 206, 208, and 210. Each of the entries is utilized to predict whether a conditional branch instruction associated with the entry will be taken or not taken. For the example depicted, aliasing table 200 is a 16 Kbyte sized table. Each entry field is associated with only one conditional branch instruction. Each entry field is preferably a one-bit field. Those skilled in the art will recognize that any size entry field may be utilized. However, preferably, the aliasing table entry field should be smaller than the branch history table entry field.

As an example, entry 108 of branch history table 100 may be associated with two conditional branch instructions, conditional branch instruction A and conditional branch instruction B. Conditional branch instruction A may be associated with entry 208 of aliasing table 200, while conditional branch instruction B may be associated with entry 210 of aliasing table 200. Entry 108 predicts the branch associated with entry 108 will not be taken. However, it is not known when utilizing only table 100 for which instruction this prediction is made. Therefore, aliasing table 200 may be utilized.

If conditional branch instruction B associated with entry 210 is being analyzed, it is clear from aliasing table 200 that aliasing has occurred in branch history table 100 because entry 108 predicts the branch will not be taken, while entry 210 predicts the branch will be taken.

Therefore, when making the prediction for conditional branch instruction B, the associated entry 210 from aliasing table 200 must be utilized to make the prediction. And, entry 108 of branch history table 100 must be minimally corrected. Entry 108 will then be corrected by changing the value of entry 108 to "10".

As another example, a first conditional branch instruction may have the address "0000 0000 0000 00A0", while a second conditional branch instruction may have the address "0000 0000 0000 10A0". Both conditional branch instructions map to entry 160 in branch history table 100. The first conditional branch instruction maps to entry 160 in aliasing table 200, while the second conditional branch instruction maps to entry 1184 in aliasing table 200.

Figure 4:
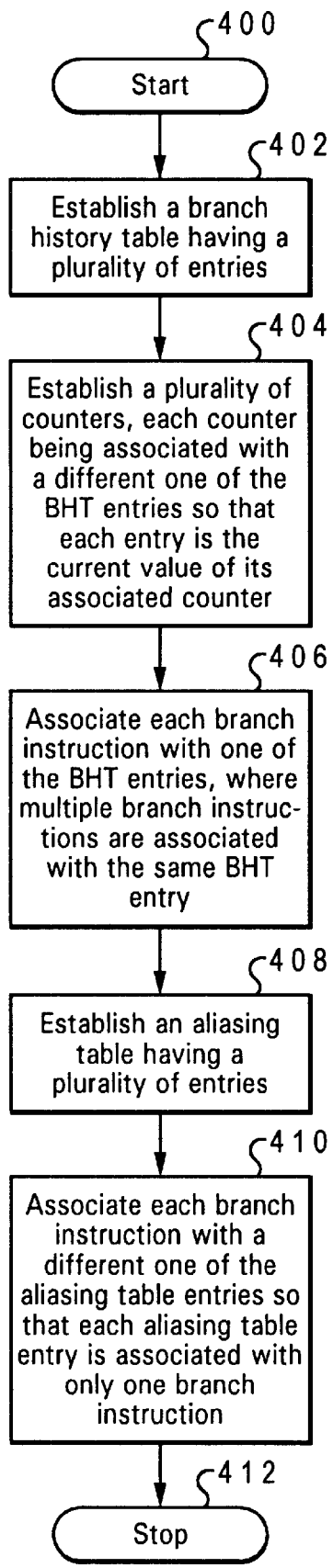
FIG. 4 illustrates a high level flow chart which depicts establishing a branch history table and an aliasing table in accordance with the method and system of the present invention.

FIG. 4 illustrates a high level flow chart which depicts establishing a branch history table and an aliasing table in accordance with the method and system of the present invention. The process starts as depicted at block 400 and thereafter passes to block 402 which depicts establishing a branch history table having a plurality of entries. Next, block 404 illustrates establishing a plurality of counters. Each counter is associated with a different one of the branch history table entries. Each branch history table entry contains the current value of the counter associated with the entry.

Thereafter, block 406 depicts associating each conditional branch instruction with one of the branch history table entries. Some entries of the branch history table will be associated with more than one conditional branch instruction. Therefore, the value of the entry, i.e. the current value of the entry's associated counter, may not be correct for any of the conditional branch instructions associated with the entry.

The process then passes to block 408 which illustrates establishing an aliasing table having a plurality of entries. Next, block 410 depicts associating each conditional branch instruction with a different one of the entries of the aliasing table. In this manner, each entry of the aliasing table is associated with only one instruction. The process then terminates as illustrated at block 412.

Figure 5:
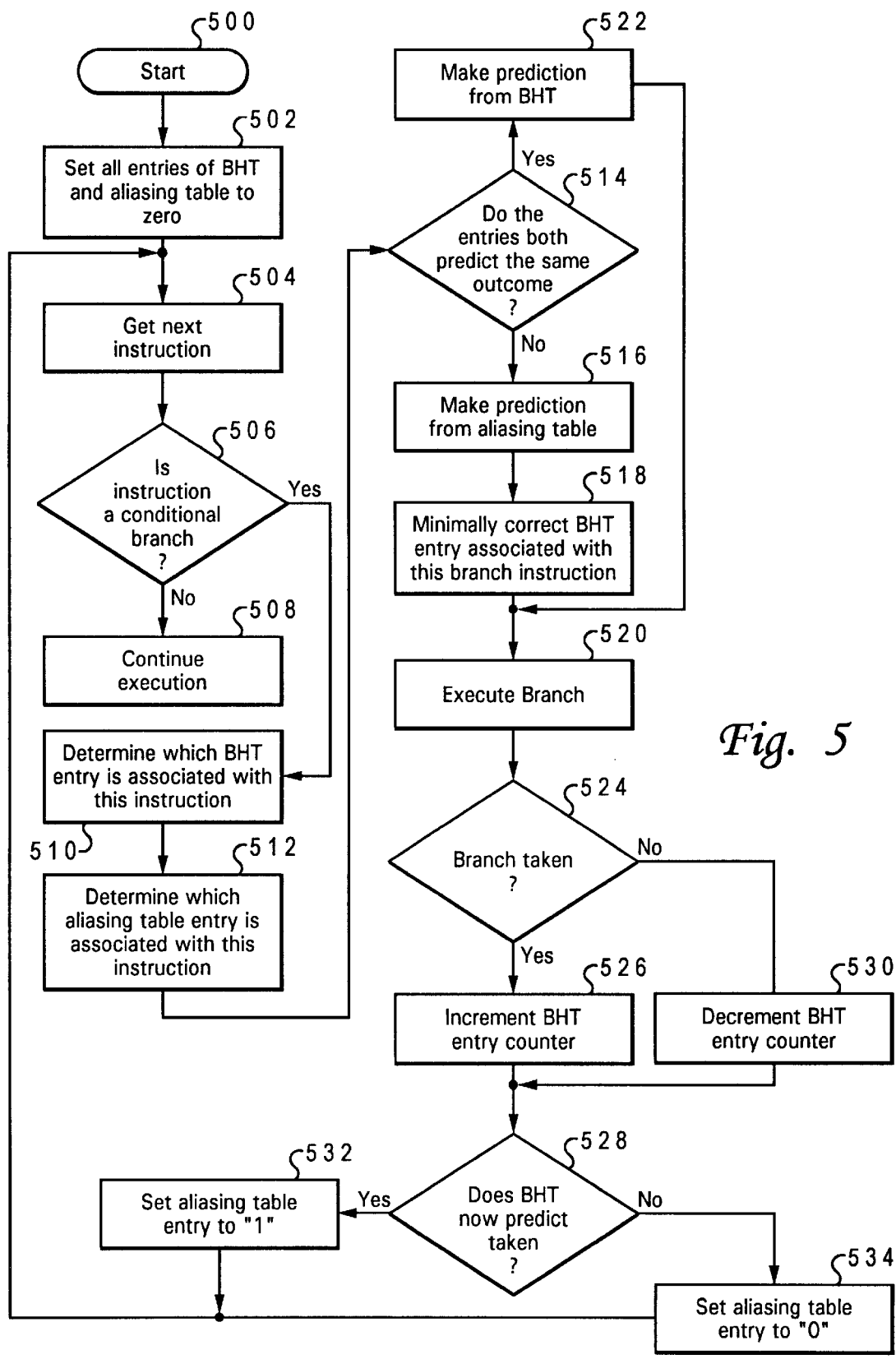
FIG. 5 depicts a high level flow chart which illustrates predicting the outcome of an execution of conditional branch instructions utilizing a branch history and an aliasing table in accordance with the method and system of the present invention.

FIG. 5 depicts a high level flow chart which illustrates predicting the outcome of conditional branch instructions utilizing a branch history table and an aliasing table in accordance with the method and system of the present invention. The process starts as illustrated at block 500 and thereafter passes to block 502 which depicts setting all entries of the branch history table and aliasing table equal to zero. Next, block 504 illustrates getting the next instruction to process. Thereafter, block 506 depicts a determination of whether or not the instruction is a conditional branch instruction. If a determination is made that the instruction is not a conditional branch instruction, the process passes to block 508 which illustrates the continuation of processing.

Referring again to block 506, if a determination is made that the instruction is a conditional branch instruction, the process passes to block 510 which depicts determining which entry of the branch history table is associated with this instruction. Thereafter, block 512 illustrates determining which entry of the aliasing table is associated with this instruction. The process then passes to block 514.

Block 514 depicts a determination of whether or not both entries predict the same outcome. For the branch history table, the instruction will be predicted to be taken when the value of the entry is equal to at least half its possible maximum value. For the embodiment depicted, each entry of the branch history table is the current value of the associated counter which is a two-bit counter. Therefore, when the counter is equal to or greater than a value of "10", the branch will be predicted to be taken.

The aliasing table includes an entry for each possible conditional branch instruction. Each entry is one bit. For the aliasing table, the instruction will be predicted to be taken when the entry is a "1". The instruction will be predicted to be not taken when the entry is a "0".

Referring to block 514, if a determination is made that for this instruction the branch history table and the aliasing table both predict the same outcome, the process passes to block 522 which illustrates making this prediction utilizing the branch history table. The process then passes to block 520.

Referring again to block 514, if a determination is made that for this instruction the branch history table and the aliasing table predict a different outcome, the process passes to block 516 which illustrates making this prediction utilizing the aliasing table. The process then passes to block 518 which depicts correcting the entry of the branch history table associated with this instruction. The entry is corrected to reflect the outcome predicted by the aliasing table. The entry is only minimally corrected, however. If the aliasing table predicts the branch to be taken, the entry of the branch history table will be set to a value indicating the branch to be taken. Because the branch history table entries are multiple bits, however, several different values indicate a prediction that the branch will be taken. For example, in the preferred embodiment, where the counter is a two-bit counter, values "10" and "11" both predict the branch will be taken. Values "00" and "01" both predict the branch will not be taken. Block 518 illustrates the entry will be minimally corrected. Therefore, if the entry is to be minimally corrected to indicate a prediction that the branch will be taken, the entry will be set to "10". If the entry is to be minimally corrected to indicate a prediction that the branch will not be taken, the entry will be set to "01".

The process then passes to block 520 which depicts the execution of the conditional branch instruction. Next, block 524 illustrates a determination of whether or not the branch was actually taken. If a determination is made that the branch was taken, the process passes to block 526 which depicts incrementing the counter whose value is displayed in the branch history table entry associated with this conditional branch instruction. Saturating counters are preferably utilized to implement the invention. Therefore, when the counter reaches the value "11" for a two-bit counter, the counter will not continue to be incremented.

The counter will hold at a value of "11". Thereafter, the process passes to block 528.

Referring again to block 524, if a determination is made that the branch was not taken, the process passes to block 530 which depicts decrementing the counter whose value is displayed in the branch history table entry associated with this conditional branch instruction. Because saturating counters have been utilized, the counter value will not change once it is decremented to "00". Thereafter, when block 530 is reached in the process, the counter will hold at its value of "00". The process then passes to block 528.

Block 528 illustrates a determination of whether or not the branch history table entry now predicts that the branch will be taken. If a determination is made that the branch history table now predicts that the branch will be taken, the process passes to block 532 which depicts setting the entry of the aliasing table associated with this conditional branch instruction equal to a "1". The process then passes back to block 504.

Referring again to block 528, if a determination is made that the branch history table now predicts that the branch will not be taken, the process passes to block 534 which depicts setting the entry of the aliasing table associated with this conditional branch instruction equal to a "0". The process then passes back to block 504.

While a preferred embodiment has been particularly shown and described, it will be understood by those skilled in the art that various changes in form and detail may be made therein without departing from the spirit and scope of the present invention.

What is claimed is:

1. A method in a superscalar processor for improving the accuracy of predictions of a plurality of conditional branch instructions by detecting branch aliasing in a branch history table, said method comprising the steps of:
   establishing said branch history table including a plurality of entries, some of said plurality of entries being associated with at least two of said plurality of conditional branch instructions;
   establishing an aliasing table including a plurality of entries, each of said plurality of aliasing table entries being associated with only one of said plurality of conditional branch instructions, wherein each of said plurality of aliasing table entries is associated with a different one of said plurality of conditional branch instructions;
   prior to executing one of said plurality of conditional branch instructions:
      predicting an outcome of said execution of said one of said plurality of conditional branch instructions utilizing one of said plurality of branch history table entries associated with said one of said plurality of conditional branch instructions; and
      predicting an outcome of said execution of said one of said plurality of conditional branch instructions utilizing one of said plurality of aliasing table entries associated with said one of said plurality of conditional branch instructions;
      detecting branch aliasing by comparing said prediction made utilizing said branch history table with said prediction made utilizing said aliasing table; and
      determining that branch aliasing occurred and utilizing said prediction made utilizing said aliasing table for predicting said outcome of said execution of said one of said plurality of conditional branch instructions in response to said predictions being different.

2. The method according to claim 1, further comprising the steps of:
   establishing each of said plurality of aliasing table entries having a one-bit wide field; and
   establishing each of said plurality of branch history table entries having a field at least two-bits wide, wherein a quantity of said plurality of aliasing table entries is greater than a quantity of said plurality of branch history table entries.

3. The method according to claim 2, further comprising the step of minimally correcting said one of said plurality of branch history table entries to indicate said prediction made utilizing said aliasing table in response to said predictions being different.

4. The method according to claim 3, further comprising the steps of:
   executing said one of said plurality of conditional branch instructions;
   determining said outcome of said one of said plurality of conditional branch instructions;
   updating said one of said plurality of branch history table entries by incrementing said one of said plurality of branch history table entries associated with said one of said plurality of conditional branch instructions in response to said outcome being said one of said plurality of conditional branch instructions being taken; and
   updating said one of said plurality of branch history table entries by decrementing said one of said plurality of branch history table entries associated with said one of said plurality of conditional branch instructions in response to said outcome being said one of said plurality of conditional branch instructions not being taken.

5. The method according to claim 4, further comprising the steps of:
   utilizing said one of said plurality of branch history table entries to predict an outcome of said one of said plurality of conditional branch instructions in response to said updating said one of said plurality of branch history table entries;
   setting said one of said plurality of entries of said aliasing table equal to a one in response to said predicted outcome being said one of said conditional branch instructions being taken determined utilizing said one of said plurality of branch history table entries; and
   setting said one of said plurality of entries of said aliasing table equal to a zero in response to said predicted outcome being said one of said conditional branch instruction being not taken determined utilizing said one of said plurality of branch history table entries.

6. The method according to claim 5, further comprising the steps of:
   predicting said outcome of said one of said plurality of conditional branch instructions by determining whether said one of said plurality of branch history table entries is equal to or greater than half its maximum possible value;
   predicting that said branch will be taken in response to said one of said plurality of branch history table entries being equal to or greater than half its maximum possible value; and
   predicting that said branch will not be taken in response to said one of said plurality of branch history table entries being less than half its maximum possible value.

7. The method according to claim 6, further comprising the steps of:

predicting an outcome of said execution of said one of said plurality of conditional branch instructions utilizing one of said plurality of aliasing table entries by determining whether said one of said plurality of aliasing table entries is equal to a one;

predicting that said branch will be taken in response to said one of said plurality of aliasing table entries being equal to a one; and predicting that said branch will not be taken in response to said one of said plurality of aliasing table entries being equal to zero.

8. A processor for improving the accuracy of predictions of a plurality of conditional branch instructions by detecting branch aliasing in a branch history table, comprising:

means for establishing said branch history table including a plurality of entries, some of said plurality of entries being associated with at least two of said plurality of conditional branch instructions;

means for establishing an aliasing table including a plurality of entries, each of said plurality of aliasing table entries being associated with only one of said plurality of conditional branch instructions, wherein each of said plurality of aliasing table entries is associated with a different one of said plurality of conditional branch instructions;

prior to executing one of said plurality of conditional branch instructions:

means for predicting an outcome of said execution of said one of said plurality of conditional branch instructions utilizing one of said plurality of branch history table entries associated with said one of said plurality of conditional branch instructions; and means for predicting an outcome of said execution of said one of said plurality of conditional branch instructions utilizing one of said plurality of aliasing table entries associated with said one of said plurality of conditional branch instructions;

means for detecting branch aliasing by comparing said prediction made utilizing said branch history table with said prediction made utilizing said aliasing table; and means for determining that branch aliasing occurred and utilizing said prediction made utilizing said aliasing table for predicting said outcome of said execution of said one of said plurality of conditional branch instructions in response to said predictions being different.

9. The processor according to claim 8, further comprising:

means for establishing each of said plurality of aliasing table entries having a one-bit wide field; and means for establishing each of said plurality of branch history table entries having a field at least two-bits wide, wherein a quantity of said plurality of aliasing table entries is greater than a quantity of said plurality of branch history table entries.

10. The processor according to claim 9, further comprising means for minimally correcting said one of said plurality of branch history table entries to indicate said prediction made utilizing said aliasing table in response to said predictions being different.

11. The processor according to claim 10, further comprising:

means for executing said one of said plurality of conditional branch instructions;

means for determining said outcome of said one of said plurality of conditional branch instructions;

means for updating said one of said plurality of branch history table entries by incrementing said one of said plurality of branch history table entries associated with said one of said plurality of conditional branch instructions in response to said outcome being said one of said plurality of conditional branch instructions being taken; and means for updating said one of said plurality of branch history table entries by decrementing said one of said plurality of branch history table entries associated with said one of said plurality of conditional branch instructions in response to said outcome being said one of said plurality of conditional branch instructions not being taken.

12. The processor according to claim 11, further comprising:

means for utilizing said one of said plurality of branch history table entries to predict an outcome of said one of said plurality of conditional branch instructions in response to said updating said one of said plurality of branch history table entries;

means for setting said one of said plurality of entries of said aliasing table equal to a one in response to said predicted outcome being said one of said conditional branch instructions being taken determined utilizing said one of said plurality of branch history table entries; and means for setting said one of said plurality of entries of said aliasing table equal to a zero in response to said predicted outcome being said one of said conditional branch instruction being not taken determined utilizing said one of said plurality of branch history table entries.

13. The processor according to claim 12, further comprising:

means for predicting said outcome of said one of said plurality of conditional branch instructions by determining whether said one of said plurality of branch history table entries is equal to or greater than half its maximum possible value;

means for predicting that said branch will be taken in response to said one of said plurality of branch history table entries being equal to or greater than half its maximum possible value; and means for predicting that said branch will not be taken in response to said one of said plurality of branch history table entries being less than half its maximum possible value.

14. The processor according to claim 13, further comprising:

means for predicting an outcome of said execution of said one of said plurality of conditional branch instructions utilizing one of said plurality of aliasing table entries by determining whether said one of said plurality of aliasing table entries is equal to a one;

means for predicting that said branch will be taken in response to said one of said plurality of aliasing table entries being equal to a one; and means for predicting that said branch will not be taken in response to said one of said plurality of aliasing table entries being equal to zero.

* * * * *